United States Patent [19]

Naef

[11] Patent Number: 4,750,228
[45] Date of Patent: Jun. 14, 1988

[54] DISPERSE DYES

[75] Inventor: Rudolf Naef, Lupsingen, Switzerland

[73] Assignee: Ciba-Geigy Corporation, Ardsley, N.Y.

[21] Appl. No.: 79,981

[22] Filed: Jul. 31, 1987

[30] Foreign Application Priority Data

Aug. 6, 1986 [CH] Switzerland .................. 3158/86

[51] Int. Cl.$^4$ .................. C09B 57/00; D06P 1/16
[52] U.S. Cl. .................. 8/636; 8/922
[58] Field of Search .................. 8/636

[56] References Cited
FOREIGN PATENT DOCUMENTS
2026528 2/1980 United Kingdom.

Primary Examiner—A. Lionel Clingman
Assistant Examiner—John F. McNally
Attorney, Agent, or Firm—Edward McC. Roberts; Meredith C. Findlay

[57] ABSTRACT

Disclosed are novel dyes of the formula

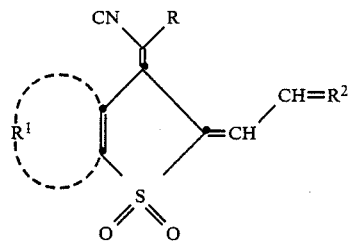

wherein
R is cyano, alkoxycarbonyl containing 1 to 6 carbon atoms in the alkoxy moiety, alkylcarbonyl containing 1 to 6 carbon atoms in the alkyl moiety, carbamoyl or carbamoyl which is N-monosubstituted or N,N-disubstituted by $C_1$-$C_6$alkyl or nitro,
$R^1$ is the radical of an aromatic system, and
$R^2$ is the radical of a 5- or 6-membered ring containing at least one nitrogen atom and at least one double bond and which may be fused with aromatic rings.

The dyes are particularly suitable for dyeing polyester textile materials in red to green shades.

12 Claims, No Drawings

DISPERSE DYES

The present invention relates to novel disperse dyes, to their preparation, and to the use thereof for dyeing and printing regenerated or synthetic hydrophobic fibres.

The novel disperse dyes have the formula

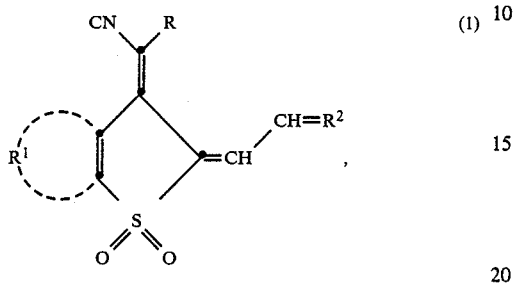
(1)

wherein
R is cyano, alkoxycarbonyl containing 1 to 6 carbon atoms in the alkoxy moiety, alkylcarbonyl containing 1 to 6 carbon atoms in the alkyl moiety, carbamoyl or carbamoyl which is N-monosubstituted or N,N-disubstituted by $C_1$–$C_6$alkyl or nitro,
$R^1$ is the radical of an aromatic system, and
$R^2$ is the radical of a 5- or 6-membered ring containing at least one nitrogen atom and at least one double bond and which may be fused with aromatic rings.

Preferred compounds of formula (1) are those wherein R is cyano and $R^1$ is the radical of an unsubstituted benzene or naphthalene ring.

In addition to the especially preferred meaning of cyano (—CN), the substituent R may also be nitro, alkoxycarbonyl (—COOR′), wherein R′ is alkyl of 1 to 6, preferably 1 to 4, carbon atoms, e.g. methyl, ethyl, n-propyl, n-butyl, as well as the isomers thereof such as isopropyl, isobutyl or tert-butyl; or R is alkylcarbonyl (—COR′), carbamoyl (—CONH₂) or N-monosubstituted or N,N-disubstituted carbamoyl (—CONHR′ or —CONR′R′), wherein R′ is as defined above.

Possible substituents at the ring R′ are the customary nonionic substituents of disperse dyes and are preferably: chlorine, bromine, hydroxy, amino, $C_1$–$C_4$alkyl, phenyl, $C_1$–$C_4$alkoxy, phenoxy, cyano, nitro, $C_1$–$C_4$alkylsulfonyl, sulfamoyl, $C_1$–$C_4$alkylsulfamoyl or di-$C_1$–$C_4$-alkylsulfamoyl, phenylsulfamoyl, N-phenyl-N-$C_1$–$C_2$alkylsulfamoyl, $C_1$–$C_6$alkoxycarbonyl, phenoxycarbonyl, carbamoyl, $C_1$–$C_4$-alkylcarbamoyl or di-$C_1$–$C_4$alkylcarbamoyl, phenylcarbamoyl or N-phenyl-N-$C_1$–$C_2$alkylcarbamoyl, $C_1$–$C_6$alkylcarbonyloxy, chloro- or bromo-$C_1$–$C_2$alkylcarbonyloxy, $C_1$–$C_6$alkoxycarbonyloxy, $C_1$–$C_2$alkoxy-$C_2$–$C_6$alkoxycarbonyloxy, phenoxycarbonyloxy, $C_1$–$C_4$alkylsulfonyloxy, phenylsulfonyloxy, $C_1$–$C_4$alkylcarbonylamino, $C_1$–$C_2$alkoxy-$C_2$–$C_4$alkoxycarbonylamino, chloro- or bromo-$C_1$–$C_2$alkylcarbonylamino, $C_1$–$C_4$-alkoxycarbonylamino, phenoxycarbonylamino, aminocarbonylamino, $C_1$–$C_4$alkylaminocarbonylamino or di-$C_1$–$C_4$alkylaminocarbonylamino, phenylaminocarbonylamino, N-phenyl-N-$C_1$–$C_2$alkylaminocarbonylamino, benzoyloxy, naphthoyloxy, benzoylamino, di-$C_1$–$C_4$alkylsulfamoyloxy, $C_1$–$C_4$alkylcarbamoyloxy, or di-$C_1$–$C_4$alkylcarbamoyloxy, or phenylcarbamoyloxy.

In preferred dyes of formula (1) $R^1$ is the radical of a benzene ring which is unsubstituted or substituted by chlorine, bromine, hydroxy, $C_1$–$C_4$alkoxy, cyano, nitro, $C_1$–$C_2$alkyl, $C_1$–$C_6$alkoxycarbonyl, phenoxycarbonyl, carbamoyl, $C_1$–$C_4$alkylcarbamoyl or di-$C_1$–$C_4$alkylcarbamoyl, phenylcarbamoyl, N-phenyl-N-$C_1$–$C_2$alkylcarbamoyl, $C_1$–$C_6$-alkylcarbonyloxy, benzoyloxy, $C_1$–$C_6$alkoxycarbonyloxy or phenoxycarbonyloxy.

The radical $R^2$ is preferably a radical selected from:

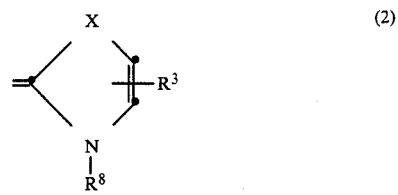
(2)

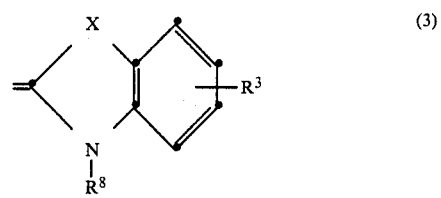
(3)

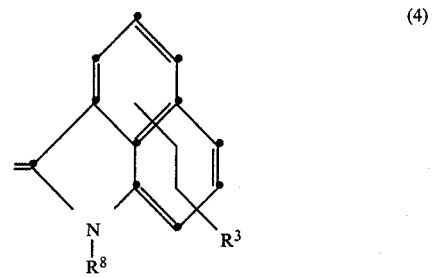
(4)

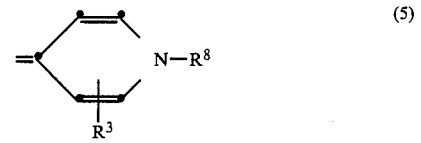
(5)

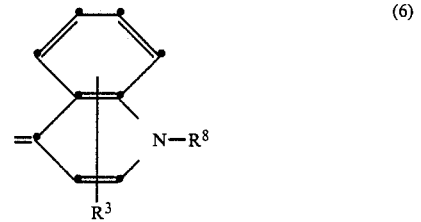
(6)

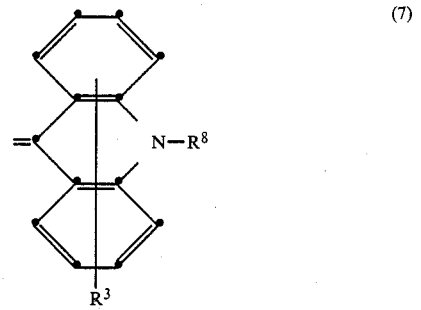
(7)

wherein
$R^8$ is a $C_1$–$C_6$alkyl radical,

X is —O—, —S—, —CH=CH—, —NR⁴— or

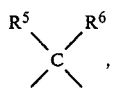

wherein R⁴ is hydrogen, phenyl or $C_1$-$C_6$alkyl, $R^5$ and $R^6$ are each independently of the other $C_1$-$C_4$alkyl, or $R^5$ and $R^6$, together with the carbon atom to which they are attached, are a $C_5$-$C_7$cycloalkyl radical, and $R^3$ is hydrogen, chlorine, bromine, hydroxy, $C_1$-$C_4$alkyl, $C_1$-$C_4$alkoxy, cyano, nitro, amino, $C_1$-$C_4$alkylamino or di-$C_1$-$C_4$alkylamino, phenylamino, phenoxy, phenyl, $C_1$-$C_4$alkylsulfonyl, carbamoyl, $C_1$-$C_4$alkylcarbamoyl or di-$C_1$-$C_4$alkylcarbamoyl, $C_1$-$C_6$alkoxycarbonyl, phenoxycarbonyl, phenylcarbamoyl, N-phenyl-N-$C_1$-$C_2$-alkylcarbamoyl, $C_1$-$C_6$alkylcarbonyloxy, benzoyloxy, $C_1$-$C_6$alkoxycarbonyloxy, phenoxycarbonyloxy, sulfamoyl, $C_1$-$C_4$alkylsulfamoyl or di-$C_1$-$C_4$alkylsulfamoyl.

In this invention, alkyl is unbranched or branched alkyl which may be substituted e.g. by hydroxy, cyano, chlorine, bromine, alkoxy, cyanoalkoxy, alkylcarbonyloxy or phenyl.

The phenyl radicals cited as substituents may also be further substituted, e.g. by hydroxy, chlorine, bromine, cyano, nitro, $C_1$-$C_4$alkyl, $C_1$-$C_4$alkoxy or amino.

Particularly preferred dyes of formula (1) are those wherein $R^2$ is a radical of formula

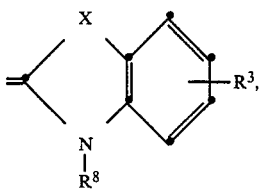

wherein
$R^8$ is a $C_1$-$C_4$alkyl radical,
X is —S—, —CH=CH— or

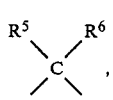

wherein $R^5$ and $R^6$ are each methyl or ethyl, or $R^5$ and $R^6$, together with the carbon atom to which they are attached, are cyclohexyl, and
$R^3$ is hydrogen, chlorine, bromine, nitro, cyano, $C_1$-$C_4$alkoxy, $C_1$-$C_2$alkyl, amino, $C_1$-$C_4$alkylamino or di-$C_1$-$C_4$alkylamino, hydroxy, phenoxy or phenylamino.

On account of the ease with which they can be obtained and of their good tinctorial properties, the most preferred dyes are those of formula

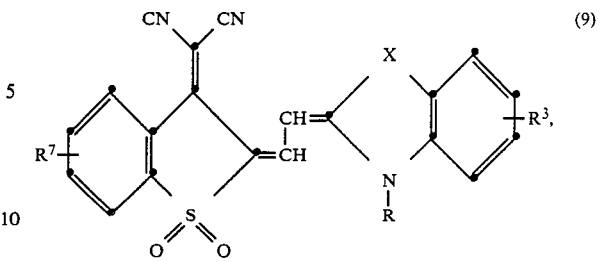

wherein
R is a $C_1$-$C_4$alkyl radical,
X is —S—, —CH=CH— or

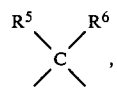

wherein $R^5$ and $R^6$ are each methyl or ethyl, or $R^5$ and $R^6$, together with the carbon atom to which they are attached, are cyclohexyl, and
$R^3$ is hydrogen, chlorine, bromine, nitro, cyano, $C_1$-$C_4$alkoxy, $C_1$-$C_2$alkyl, amino, $C_1$-$C_4$alkylamino or di-$C_1$-$C_4$alkylamino, hydroxy, phenoxy or phenylamino, and
$R^7$ is hydrogen, chlorine, bromine, hydroxy, $C_1$-$C_4$alkoxy, cyano, nitro, $C_1$-$C_2$alkyl, $C_1$-$C_6$alkoxycarbonyl, phenoxycarbonyl, carbamoyl, $C_1$-$C_4$alkylcarbamoyl or di-$C_1$-$C_4$alkylcarbamoyl, phenylcarbamoyl, N-phenyl-N-$C_1$-$C_2$alkylcarbamoyl, $C_1$-$C_6$alkylcarbonyloxy, benzoyloxy, $C_1$-$C_6$alkoxycarbonyloxy or phenoxycarbonyloxy.

The compounds of the present invention are prepared by condensing a compound of formula

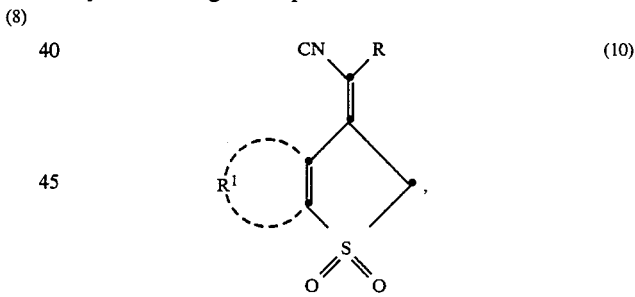

with an aldehyde of formula

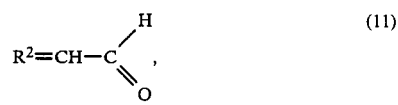

in which formulae above R, $R^1$ and $R^2$ have the given meanings.

The condensation is carried out in accordance with known reactions of similar nature in an inert organic solvent, e.g. an alcohol, preferably ethanol, n-propanol, isopropanol, n-butanol, isobutanol, sec-butanol, tert-butanol, methoxyethanol or ethoxyethanol, and also benzene, toluene, chlorobenzene, dichlorobenzene, chloroform, dimethylformamide, N-methylpyrrolidone, dimethylsulfoxide, sulfolane or acetonitrile, in the temperature range from 20° to 180° C., preferably from 40° to 140° C., and conveniently in the presence of a catalyst, preferably an organic base, e.g. pyridine, piperidine, ammonium acetate or β-alanine. It is preferred to add the catalyst together with an acid, e.g. acetic acid.

The compounds of formula (10) are known or they can be prepared in known manner.

The aldehydes of formula (11) are also known. Instead of the aldehydes it is also possible to use corresponding functionally modified aldehydes, e.g. nitrones or imines.

The dyes of formula (1) are obtained in good yield and purity. They have great brilliance and excellent tinctorial strength.

The compounds of formula (1) can be used as dyes for dyeing and printing regenerated and, in particular, synthetic hydrophobic fibres, especially textile materials. Textile materials made from blends which contain such regenerated and synthetic hydrophobic fibres can also be dyed and printed with the compounds of this invention.

Suitable regenerated textile materials are in particular cellulose 2½-acetate and cellulose triacetate.

Synthetic hydrophobic textile materials consist in particular of linear aromatic polyesters, for example polycondensates of therephthalic acid and a glycol, especially ethylene glycol, or polycondensates of terephthalic acid and 1,4-bis(hydroxyethyl)hexahydrobenzene; and of polycarbonates, e.g. those obtained from α,α-dimethyl-4,4,-dihydroxydiphenylmethane and phosgene; and of polyvinyl chloride and polyamide fibres.

Application of the compounds of the invention to the textile materials is effected by known dyeing methods. For example, polyester are dyed by the exhaust process from an aqueous dispersion in the presence of conventional anionic or nonionic dispersants and, optionally, carriers, in the temperature range from 80° to 140° C. It is preferred to dye cellulose 2½-acetate in the temperature range from about 65° to 85° C. and cellulose triacetate in the temperature range up to 115° C.

The novel dyes dye wool and cotton simultaneously present in the dyebath not at all or only to a minimum degree (very good resist), so that they can also be readily used for dyeing the polyester component of polyester/wool and polyester/cellulose blends.

The dyes of this invention are particularly suitable for dyeing by the thermosol process and textile printing.

The textile material can be in any form of presentation, e.g. as fibres, filaments or webs, and as wovens or knits.

Prior to use it is advantageous to convert the dyes of this invention into a dye formulation. This is achieved by grinding the dye to an average particle size in the range from 0.01 to 10 μ. Grinding can be effected in the presence of a dispersant. For example, the dried dye is ground with a dispersant or kneaded in paste form with a dispersant and subsequently vacuum dried or spray dried. Dyeing and printing can be carried out with these formulations after addition of water.

Conventional thickeners are used for printing, e.g. modified or unmodified natural products such as alginates, British gum, gum arabic, crystal gum, carob bean gum, tragacanth, carboxymethyl cellulose, hydroxyethyl cellulose, starch or synthetic products, e.g. polyacrylamides, polyacrylic acid or copolymers thereof, or polyvinyl alcohols.

The dyes of this invention are substantially insensitive to carriers and impart to the cited materials, especially polyester, level red to green shades of very good general use fasteness properties, in particular good lightfastness, good fastness to sublimation, heat setting, pleating and chlorine, and good wetfastness properties such as fastness to water, perspiration and washing. The dyeings also have good pH stability and very good crockfastness. In addition, the dyeings obtained are of high tinctorial strength and exhibit no catalytic fading.

The dyes of this invention can also be suitably used for obtaining combination shades together with other dyes. It is, of course, also possible to use mixtures of the dyes of this invention with one another.

The novel dyes are also suitable for dyeing and pigmenting high molecular organic materials, e.g. cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins such as polystyrene, polyvinyl chloride, polyethylene, polypropylene, polyacrylonitrile, polyacrylates, polyamides, polyurethanes or polyesters, rubber, casein, silicone and silicone resins, singly or in mixtures. It is immaterial whether the above high molecular organic compounds are in the form of plastics, melts or of spinning solutions, varnishes, paints or printing inks. Depending on the end use, it is advantageous to use the compositions as toners or in the form of preparations.

The above mentioned use of the disperse dyes of formula (1) likewise constitutes an object of the present invention, as does also a process for dyeing or printing regenerated or synthetic fibre material, especially textile material, which comprises applying to, or incorporating in, said material one or more compounds of formula (1). The hydrophobic fibre material is preferably textile material made from polyester fibres.

Also falling within the scope of the present invention is the hydrophobic fibre material, preferably polyester textile material, dyed or printed by said process.

The following Examples further illustrate the invention, without implying any limitation to what is described therein. Parts and percentages are by weight, unless otherwise indicated.

EXAMPLE 1

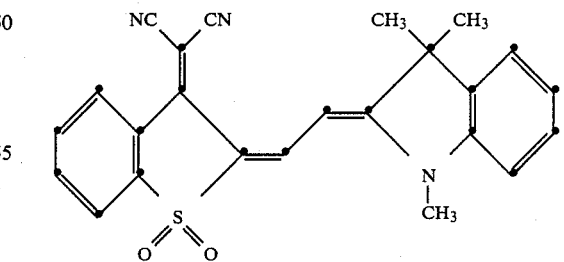

A mixture of 87 parts of 2-formylmethylene-1,3,3-trimethylindolenine and 100 parts of 3-dicyanomethylene-2,3-dihydro-1-benzothiophene-1,1-dioxide is boiled for 2 hours in 2000 parts of absolute ethanol, with the addition of a mixture of 5 parts each of acetic acid and pyridine. After the reaction mixture has cooled, the precipitate is isolated by filtration and recrystallised from ethanol, to give 110 parts of green crystals with a

EXAMPLE 2

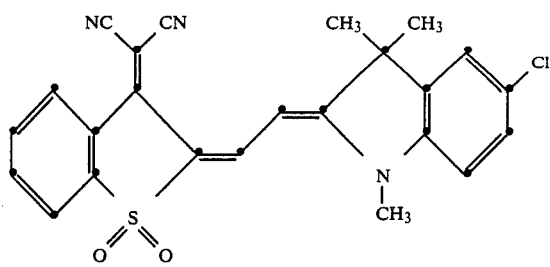

A mixture of 100 parts each of 5-chloro-2-formylmethylene-1,3,3-trimethylindolenine and 3-dicyanomethylene-2,3-dihydro-1-benzothiophene-1,1-dioxide is refluxed for 3 hours in 2000 parts of absolute ethanol, with the addition of 5 parts each of acetic acid and pyridine. After the reaction mixture has cooled, the precipitate is isolated by filtration, washed with ethanol and recrystallised from dimethylformamide, to give 130 parts of green crystals which do not melt in the temperature range up to 260° C. and which dye polyester material in reddish blue shades.

EXAMPLE 3

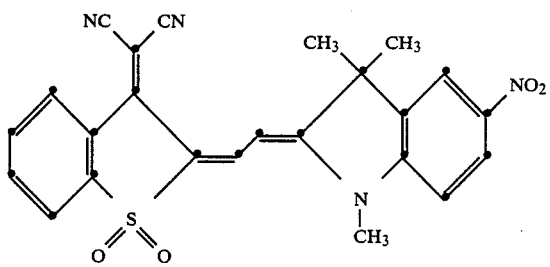

A mixture of 21.9 parts of 3-dicyanomethylene-2,3-dihydro-1-benzothiophene-1,1-dioxide and 19 parts of 2-formyl-5-nitro-1,3,3-trimethylindolenine is refluxed for 3 hours in 350 parts of ethanol, with the addition of 5.5 parts each of acetic acid and pyridine. After the reaction mixture has cooled, the opalescent green precipitate is isolated by filtration and recrystallised from N-methylpyrrolidone/water, to give 34.9 parts of product which melts at >270° C. and dyes polyester material in reddish blue shades.

EXAMPLE 4

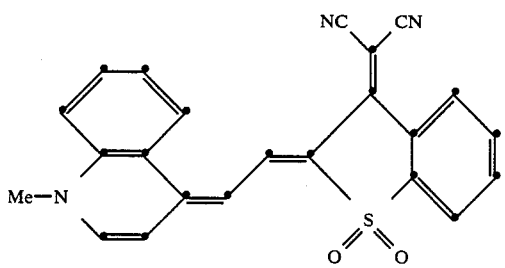

A mixture of 140 parts of 3-dicyanomethylene-2,3-dihydro-1-benzothiophene-1,1-dioxide and 71 parts of 4-formylmethylene-1-methylquinoline is refluxed for 4.5 hours in 2000 parts of absolute ethanol, with the addition of 30 parts each of acetic acid and pyridine. After the solution has cooled, the greenish yellow precipitate is isolated by filtration and recrystallised from dimethylformamide/water, to give 20 parts of green crystals which do not melt in the temperature range up to 260° C. and which dye polyester material in greenish blue shades.

EXAMPLE 5

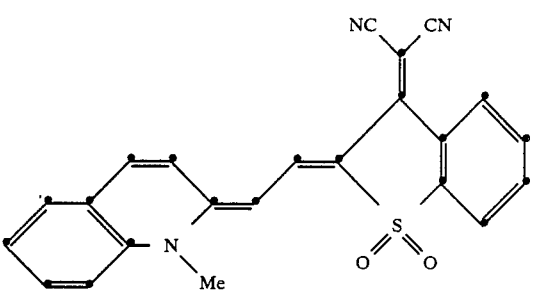

A mixture of 69 parts of 3-dicyanomethylene-2,3-dihydro-1-benzothiophene-1,1-dioxide and 49 parts of 2-formylmethylene-1-methylquinoline is refluxed for 3 hours in 1000 parts of ethanol, with the addition of 15 parts each of acetic acid and pyridine. After the solution has cooled, the precipitate is isolated by filtration and recrystallised from dimethylformamide, to give 15 parts of green crystals which melt above 260° C. and dye polyester material in greenish blue shades.

EXAMPLE 6

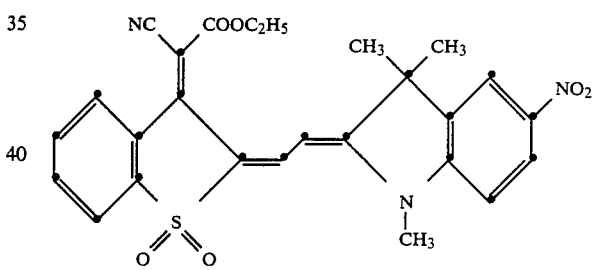

The procedure of Example 3 is repeated, replacing the 21.9 parts of 3-dicyanomethylene-2,3-dihydro-1-benzothiophene-1,1-dioxide by an equivalent amount of 3-cyanocarboethoxymethylene-2,3-dihydro-1-benzothiophene-1,1-dioxide, to give the dye of the above formula which dyes polyester material in reddish blue shades.

EXAMPLE 7

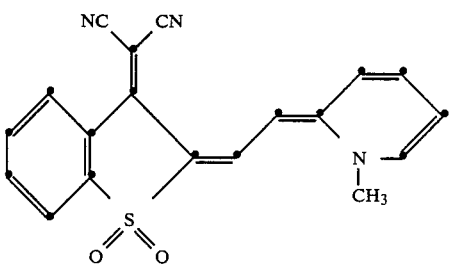

The procedure of Example 1 is repeated, replacing 2-formylmethylene-1,3,3-trimethylindolenine by an equivalent amount of 2-formylmethylene-1-methylpyridine, to give the dye of the above formula which dyes polyester material in violet shades.

EXAMPLE 8

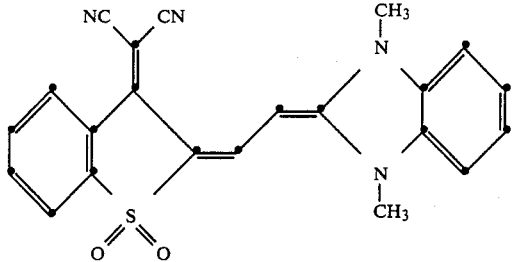

The procedure of Example 1 is repeated, replacing 2-formylmethylene-1,3,3-trimethylindolenine by an equivalent amount of 2-formylmethylene-1,3-dimethylbenzimidazole, to give the dye of the above formula which dyes polyester material in red shades.

EXAMPLE 9

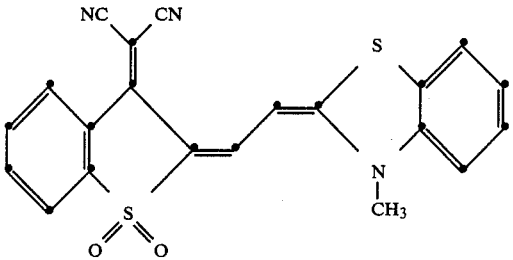

The procedure of Example 1 is repeated, replacing 2-formylmethylene-1,3,3-trimethylindolenine by an equivalent amount of 2-formylmethylene-3-methylbenzthiazole, to give the dye of the above formula which dyes polyester material in violet shades.

EXAMPLE 10

1 part of the dry, non-diluted dye of Example 1 is mixed with 1 part of sodium dinaphthylmethanedisulfonate and water and the mixture is ground to a particle size of about 2 μm or smaller. To the resultant paste consisting of dye, dispersant and water are then added 3 parts of sodium ligninsulfonate. This paste is then spray dried to give a dye powder formulation.

This dye formulation can be used for dyeing polyester material, e.g. by the HT process. The dyebath has good dispersion stability. The polyester is dyed in a reddish blue shade of good lightfastness.

EXAMPLE 11

1 part of the dye obtained in Example 1 and 2 parts of a 50% aqueous solution of the sodium salt of dinaphthylmethanedisulfonic acid are ground wet and dried.

This dye formulation is stirred in 40 parts on a 10% aqueous solution of the sodium salt of N-benzylheptadecylbenzimidazoledisulfonic acid and 4 parts of a 40% solution of acetic acid are added. A dyebath of 4000 parts is prepared therefrom by dilution with water.

100 parts of polyester fabric are put into this bath at 50° C., the temperature is raised over half an hour to 120°–130° C. and dyeing is carried out for 1 hour at this temperature in a closed vessel. The goods are then well rinsed. A brilliant reddish blue dyeing of good lightfastness is obtained.

What is claimed is:

1. A disperse dye of formula

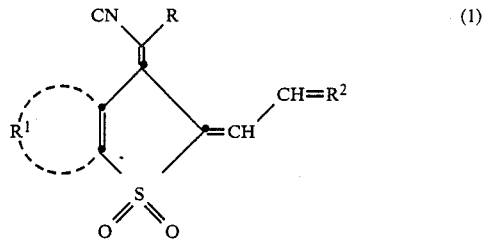

(1)

wherein

R is cyano, alkoxycarbonyl containing 1 to 6 carbon atoms in the alkoxy moiety, alkylcarbonyl containing 1 to 6 carbon atoms in the alkyl moiety, carbamoyl or carbamoyl which is N-monosubstituted or N,N-disubstituted by $C_1$–$C_6$alkyl or nitro, $R^1$ is the radical of an aromatic system, and $R^2$ is the radical of a 5- or 6-membered ring containing at least one nitrogen atom and at least one double bond and which may be fused with aromatic rings.

2. A dye according to claim 1, wherein R is cyano and $R^1$ is the radical of an unsubstituted or substituted benzene or naphthalene ring.

3. A dye according to claim 2, wherein the ring containing $R^1$ is unsubstituted or substituted by one or two members selected from the group consisting of chlorine, bromine, hydroxy, amino, $C_1$–$C_4$alkyl, phenyl, $C_1$–$C_4$alkoxy, phenoxy, cyano, nitro, $C_1$–$C_4$alkylsulfonyl, sulfamoyl, $C_1$–$C_4$alkylsulfamoyl or di-$C_1$–$C_4$alkylsulfamoyl, phenylsulfamoyl, N-phenyl-N-$C_1$–$C_2$alkylsulfamoyl, $C_1$–$C_6$alkoxycarbonyl, phenoxycarbonyl, carbamoyl, $C_1$–$C_4$alkylcarbamoyl or di-$C_1$–$C_4$alkylcarbamoyl, phenylcarbamoyl or N-phenyl-N-$C_1$–$C_2$alkylcarbamoyl, $C_1$–$C_6$alkylcarbonyloxy, chloro- or bromo-$C_1$–$C_2$alkylcarbonyloxy, $C_1$–$C_6$alkoxycarbonyloxy, $C_1$–$C_2$alkoxy-$C_2$–$C_6$alkoxycarbonyloxy, phenoxycarbonyloxy, $C_1$–$C_4$alkylsulfonyloxy, phenylsulfonyloxy, $C_1$–$C_4$alkylcarbonylamino, $C_1$–$C_2$alkoxy-$C_2$–$C_4$alkoxycarbonylamino, chloro- or bromo-$C_1$–$C_2$alkylcarbonylamino, $C_1$–$C_4$alkoxycarbonylamino, phenoxycarbonylamino, aminocarbonylamino, $C_1$–$C_4$alkylaminocarbonylamino or di-$C_1$–$C_4$alkylaminocarbonylamino, phenylaminocarbonylamino, N-phenyl-N-$C_1$–$C_2$alkylaminocarbonylamino, benzoyloxy, naphthoyloxy, benzoylamino, di-$C_1$–$C_4$alkylsulfamoyloxy, $C_1$–$C_4$-alkylcarbamoyloxy or di-$C_1$–$C_4$alkylcarbamoyloxy, or phenylcarbamoyloxy.

4. A dye according to claim 3, wherein $R^1$ is the radical of a benzene ring which is unsubstituted or substituted by chlorine, bromine, hydroxy, $C_1$–$C_4$alkoxy, cyano, nitro, $C_1$–$C_2$alkyl, $C_1$–$C_6$-alkoxycarbonyl, phenoxycarbonyl, carbamoyl, $C_1$–$C_4$alkylcarbamoyl or di-$C_1$–$C_4$alkylcarbamoyl, phenylcarbamoyl, N-phenyl-N-$C_1$–$C_2$alkylcarbamoyl, $C_1$–$C_6$alkylcarbonyloxy, benzoyloxy, $C_1$–$C_6$alkoxycarbonyloxy or phenoxycarbonyloxy.

5. A dye according to claim 1, wherein $R^2$ is a radical selected from

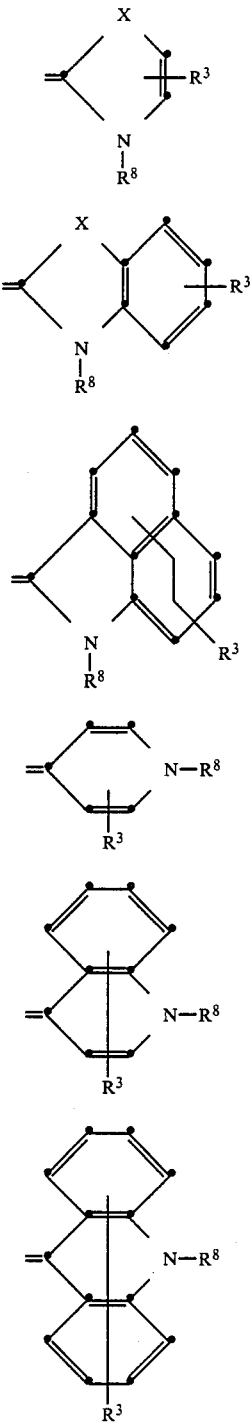

wherein
$R^8$ is a $C_1$-$C_6$alkyl radical,
X is —O—, —S—, —CH=CH—, —$NR^4$— or

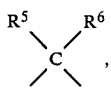

wherein $R^4$ is hydrogen, phenyl or $C_1$-$C_6$alkyl, $R^5$ and $R^6$ are each independently of the other $C_1$-$C_4$alkyl, or $R^5$ and $R^6$, together with the carbon atom to which they are attached, are a $C_5$-$C_7$cycloalkyl radical, and $R^3$ is hydrogen, chlorine, bromine, hydroxy, $C_1$-$C_4$alkyl, $C_1$-$C_4$alkoxy, cyano, nitro, amino, $C_1$-$C_4$alkylamino or di-$C_1$-$C_4$alkylamino, phenylamino, phenoxy, phenyl, $C_1$-$C_4$alkylsulfonyl, carbamoyl, $C_1$-$C_4$alkylcarbamoyl or di-$C_1$-$C_4$alkylcarbamoyl, $C_1$-$C_6$alkoxycarbonyl, phenoxycarbonyl, phenylcarbamoyl, N-phenyl-N-$C_1$-$C_2$-alkylcarbamoyl, $C_1$-$C_6$alkylcarbonyloxy, benzoyloxy, $C_1$-$C_6$alkoxycarbonyloxy, phenoxycarbonyloxy, sulfamoyl, $C_1$-$C_4$alkylsulfamoyl or di-$C_1$-$C_4$alkylsulfamoyl.

6. A dye according to claim 5, wherein $R^2$ is a radical of formula

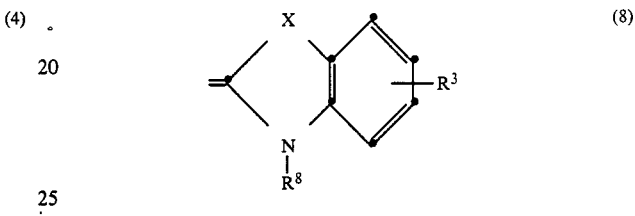

wherein
$R^8$ is a $C_1$-$C_4$alkyl radical,
X is —S—, —CH=CH— or

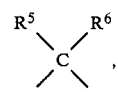

wherein $R^5$ and $R^6$ are each methyl or ethyl, or $R^5$ and $R^6$, together with the carbon atom to which they are attached, are cyclohexyl, and $R^3$ is hydrogen, chlorine, bromine, nitro, cyano, $C_1$-$C_4$alkoxy, $C_1$-$C_2$alkyl, amino, $C_1$-$C_4$alkylamino or di-$C_1$-$C_4$alkylamino, hydroxy, phenoxy or phenylamino.

7. A dye according to claim 1 of formula

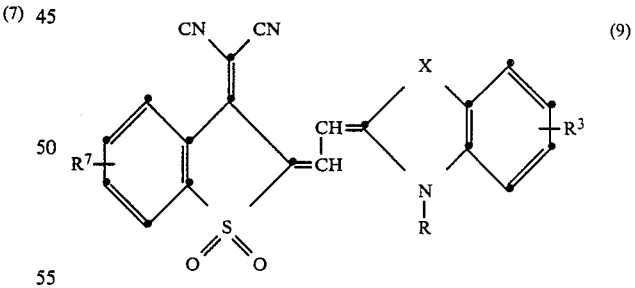

wherein
R is a $C_1$-$C_4$alkyl radical,
X is —S—, —CH=CH— or $$\begin{matrix} R^5 & R^6 \\ \diagdown & \diagup \\ & C \\ \diagup & \diagdown \end{matrix}$$

wherein $R^5$ and $R^6$ are each methyl or ethyl, or $R^5$ and $R^6$, together with the carbon atom to which they are attached, are cyclohexyl, and $R^3$ is hydrogen, chlorine, bromine, nitro, cyano, $C_1$-$C_4$alkoxy, $C_1$-$C_2$alkyl, amino, $C_1$-$C_4$alkylamino or di-$C_1$-$C_4$alkylamino, hydroxy, phenoxy or phenylamino, and $R^7$ is hydrogen, chlorine, bromine, hydroxy, $C_1$-$C_4$alkoxy, cyano, nitro, $C_1$-$C_2$alkyl, $C_1$-$C_6$alkoxycarbonyl, phenoxycarbonyl, carbamoyl, $C_1$-$C_4$alkylcarbamoyl or di-$C_1$-$C_4$alkylcarbamoyl, phenylcarbamoyl, N-phenyl-N-$C_1$-$C_2$alkylcarbamoyl, $C_1$-$C_6$carbalkoxy, benzoyloxy, $C_1$-$C_6$alkoxycarbonyloxy or phenoxycarbonyloxy.

8. A process for the preparation of a dye of formula (1) according to claim 1, which comprises condensing a compound of formula

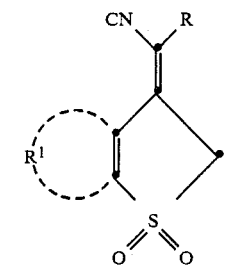

with an aldehyde of formula

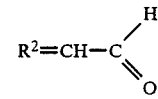

9. A process according to claim 8, wherein the reaction is carried out in an inert solvent, with the addition of a catalyst and an acid, in the temperature range from about 40° to 140° C.

10. A process for dyeing and pigmenting high molecular organic material, which comprises applying to, or incorporating in, said material one or more compounds of formula (1) as claimed in claim 1.

11. A process according to claim 10 for dyeing or printing regenerated or synthetic fibre materials, especially textile materials made from linear aromatic polyesters.

12. A process according to claim 10 for colouring thermoplastics in the melt.

* * * * *